United States Patent [19]

Angner et al.

[11] 3,902,101

[45] *Aug. 26, 1975

[54] TELEPHONE SWITCHING SYSTEM TRUNK AND SERVICE CIRCUITS

[75] Inventors: Ronald Joseph Angner, Freehold; Alexander Feiner, Rumson; Merle Victor Olsen, Lincroft, all of N.J.

[73] Assignee: Bell Telephone Laboratories, Incorporated, Murray Hill, N.J.

[ * ] Notice: The portion of the term of this patent subsequent to Feb. 19, 1991, has been disclaimed.

[22] Filed: July 23, 1973

[21] Appl. No.: 382,028

[52] U.S. Cl. .................................. 317/137; 335/153

[51] Int. Cl.[2] .......................................... H01H 47/00

[58] Field of Search ...... 317/137; 179/18 AN, 18 G, 179/6 E; 335/153

[56] References Cited

UNITED STATES PATENTS

| | | | |
|---|---|---|---|
| 2,602,150 | 7/1952 | Hauck | 317/137 X |
| 3,567,866 | 3/1971 | Briley et al. | 179/18 AH |
| 3,631,397 | 12/1971 | Mitsuhashi et al. | 317/137 |
| 3,793,601 | 2/1974 | Angner et al. | 335/153 |

*Primary Examiner*—J. D. Miller
*Assistant Examiner*—Harry E. Moose, Jr.
*Attorney, Agent, or Firm*—David H. Tannenbaum

[57] ABSTRACT

The use of a group of relays, all having only make contacts interconnected in a manner to allow a single current pulse to selectively operate one relay while at the same time releasing all the other relays, has resulted in the design of circuits where a one-hot out-of-n code can be used to control the operational states of the circuits. The fact that the relays have remanent reed sealed contacts and are thus self-latching greatly simplifies minimumization of peripheral equipment and reduces control complexity since a single current pulse can both select the desired circuit state by operating one of the relays and release any other operated relay.

6 Claims, 8 Drawing Figures

| STATE | RELAY |
|---|---|
| IDLE | 2A |
| HOLD | 2B |
| START | 2C |
| CUT THRU | 2D |

TELEPHONE SWITCHING SYSTEM TRUNK AND SERVICE CIRCUITS

BACKGROUND OF THE INVENTION

This invention relates to an arrangement for controlling circuit operations and, more particularly, to an arrangement for achieving single pulse destructive marking economically in a relay environment.

A typical relay consists of both make and break contacts; the make contacts being operable when the relay is energized for the passing of current and the break contacts being operable when the relay is energized for preventing the passage of current. Thus, by combining make and break contacts of different relays in a current path, any degree of logic can be achieved dependent upon the various circuit states of the relays. This is the traditional approach to relay logic design. A problem is presented under such an approach in that certain relays must remain operated during the entire period the circuit is in a given state and, accordingly, power is consumed and unwanted heat is generated.

To overcome this problem, in the past circuit designers have used self-latching relays which when operated remain operated until a release pulse is received. Typically, such relays operate on a magnetic latching principle where residual magnetism remains in the coils at the completion of the operate current pulse. Such relays inherently draw large bursts of power when operated and released, and tend to cause problems in the associated electronic circuitry.

Accordingly, a problem exists when it is desired to reduce the total power necessary for the operation of relay logic circuits while at the same time keeping the circuits flexible and easily controllable. This problem is compounded by the fact that often two pulses are necessary to change a circuit from one state to another, the first pulse being used to release one or more operated relays while the second pulse operates the desired relay. In situations where multiple relays are used this problem is compounded even further since such circuits require large amounts of external logic and timing arrangements to insure that the proper pulses are distributed to the proper relay at the proper time.

SUMMARY OF THE INVENTION

I have overcome these problems by an arrangement which takes advantage of make-only remanent reed (remreed) relays combined to form a network and by arranging the network in a one-pulse destruct mode so that the application of a single pulse releases any operated relay and operates a selected relay. The circuits which utilize my invention are designed using only make contacts and the logic of such circuits is arranged so that the operation of one and only one relay fully determines the state of the circuit. These circuits are further designed so that any state is achievable from any other state directly by the application of a single current pulse without regard to the prior circuit state.

I have taken advantage of the relay design described in U.S. Pat. No. 3,793,601 to R. J. Angner, A. Feiner and M. V. Olsen issued Feb. 19, 1974 by arranging a network of such relays to achieve one-pulse destructive marking using a one-hot out-of-n code.

Accordingly, it is one feature of my invention to provide a group of relays interconnected together to form a one-relay per one-state control device. It is a further feature of my invention to arrange a circuit with such a group of relays in order to achieve logic control with minimum power dissipation, while at the same time minimizing the use of contacts. It is a further feature of my invention to arrange a telephone logic circuit with relays having contamination-free contacts.

BRIEF DESCRIPTION OF THE DRAWING

These and other objects and features of my invention will become more apparent after reading the following detailed description in conjunction with the drawing in which.

DETAILED DESCRIPTION

The relay which I have shown comprising my switching network operates in the manner discussed in the above-identified patent of R. J. Angner, A. Feiner and M. V. Olsen. Accordingly, before proceeding with the detailed description, it may be helpful to note the operational characteristics of such a relay.

The relay is constructed having a plurality of reed contact sets or pairs of make contacts surrounded by two magnetic flux-producing release windings, with one winding over each contact of the contact pair (or pairs). The windings are separated from each other by an air gap and connected together in series so that an applied current pulse causes a magnetic field to be produced around one contact in one direction and around the other contact in the other direction. The resultant magnetic flux is such that the free ends of the contact pair are magnetized to the same magnetic pole and thus separate.

Each relay also contains a third winding wound in association with one of the other two windings and wound in a manner to produce a magnetic flux magnitude greater than the magnetic flux generated by the associated other winding and having a flux direction opposite to the flux direction produced by the associated other winding. The relay is designed so that a single current pulse flowing through the operate winding as well as through the release windings causes the relay contacts to close while a current pulse flowing only through the release windings causes the relay contacts to separate. Thus, the relay is capable of single-pulse destructive operation. The reed contacts are constructed of a remanent magnetic material which maintains the contacts opened or closed dependent only upon the last-received current pulse.

Figure 1:
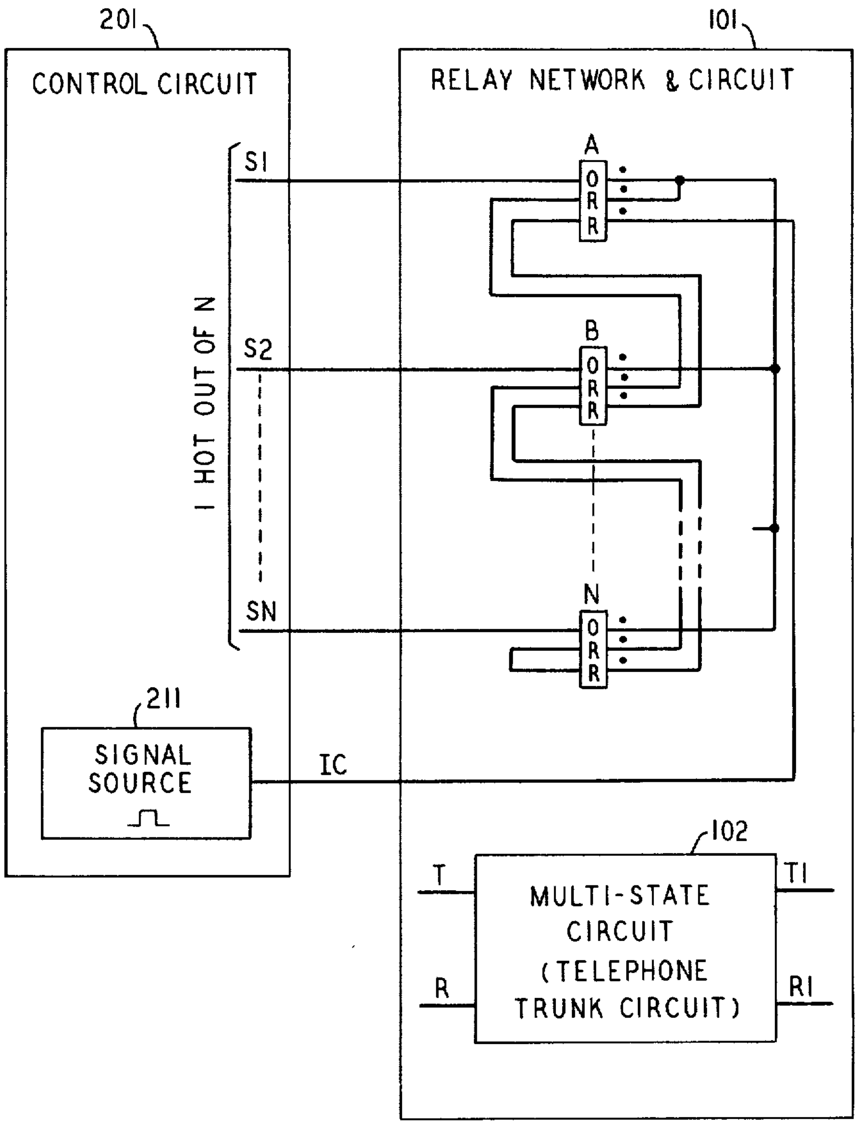
FIG. 1 shows a schematic of a relay network having *n* relays.
Figure 2:
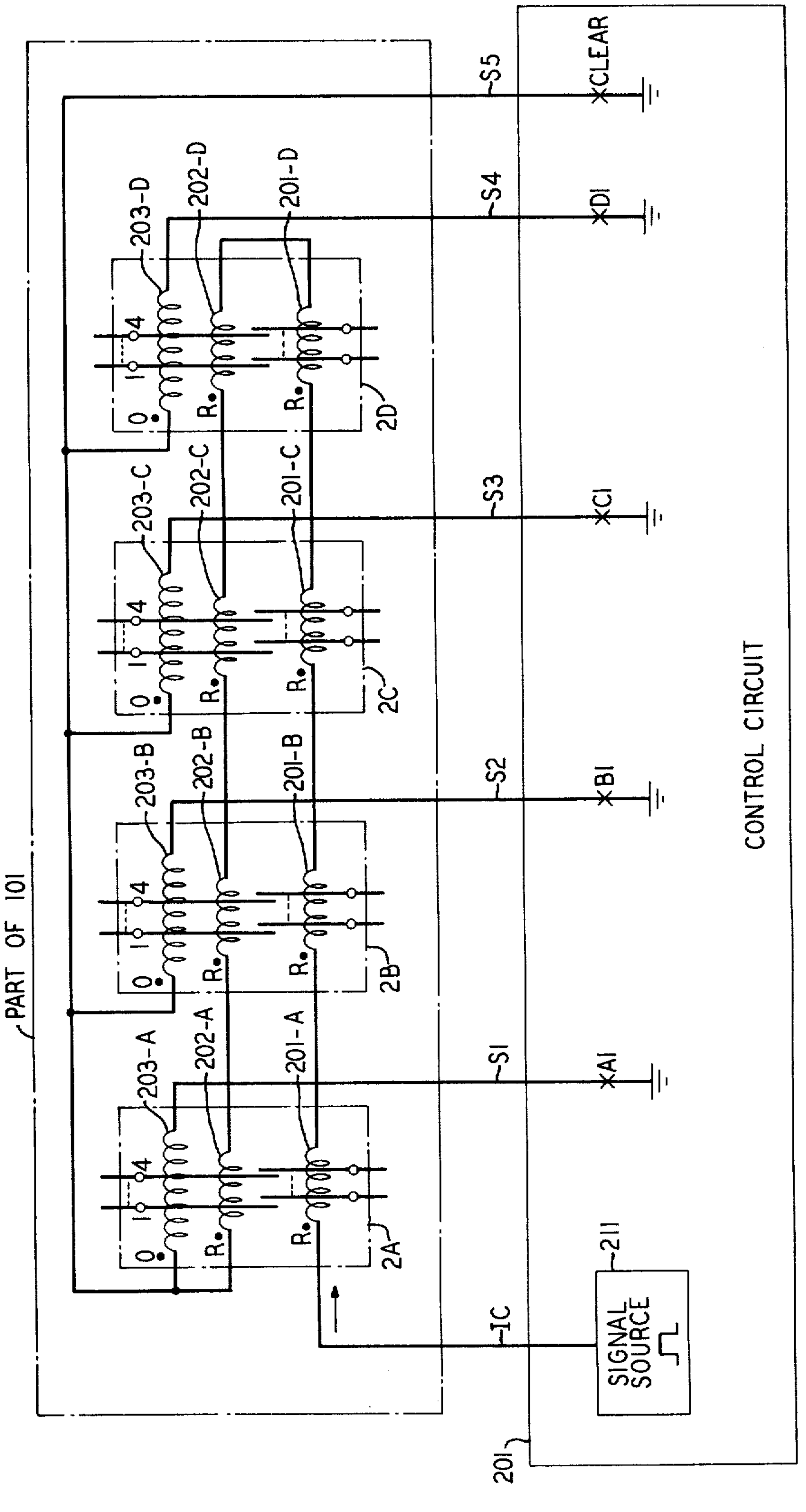
FIG. 2 shows the control arrangements for a network of four relays arranged to provide destructive marking selective operation.

In my embodiment, as shown in FIG. 1 and 2, I have shown an R associated with each release winding and an O associated with the operate winding. It should be emphasized at this point that any relay having single-pulse destructive marking can be used for the purposes of my invention.

Turning now to FIG. 1, control circuit 201 is arranged to provide a ground potential for any of the leads S1 through SN on a one-hot out-of-n basis, which means that only one lead of the group of leads S1 through SN will have the ground potential (or any other suitable signal) thereon at a particular time. The ground signal on the S- lead is used to select which of the relays A through N of circuit 101 will operate upon the application of a signal pulse on lead IC from signal source 211. As shown, relays A through N comprise a relay switching network whereby the application of a pulse on lead IC and the provision of a ground on one of the S1 through SN leads causes a selected one of the A through N relays to operate and causes any other priorly operated A through N relay to release. The particular operated one of the relays determines the operational state of the multistate circuit 102 in a manner to be more fully detailed hereinafter.

Turning now to FIG. 2, the precise manner in which the relay network operates will now be discussed. Assume that it is desired to operate relay 2B and that relay 2C is currently operated. The 2C relay, being self-holding, does not have power applied to its windings even though the contact pairs thereof are closed. As discussed above, this results from the residual magnetism of the remreed contact material. When it is desired to operate relay 2B, ground is supplied via the enabled relay B1 shown in control circuit 201 to lead S2. This ground is used to selectively control the relay network, which consists of relays 2A, 2B, 2C and 2D, and is used on lead S2 to prepare the operate path for relay 2B. A current pulse signal is then sent over lead IC from signal source 211 to the relay network. This current flows to the provided ground in lead S2 via the path now to be described; i.e., through winding 201-A of relay 2A, through winding 201-B of relay 2B, through winding 201-C of relay 2C, through winding 201-D of relay 2D, through winding 202-D of relay 2D, through winding 202-C of relay 2C, through winding 202-B of relay 2B, through winding 202-A of relay 2A, and through operate winding 203-B of relay 2B to the supplied ground.

Since current passes through both release windings of all relays 2A through 2D, the contacts of all of these relays are magnetized in a direction to cause them all to separate. Accordingly, previously operated relay 2C now releases. Also, since current also passes through the operate winding of relay 2B, that relay operates. Thus, regardless of the operational states of relays 2A, 2B, 2C and 2D prior to the application of the signal source pulse, any operated one of those relays releases while selected relay 2B operates.

As discussed, once relay 2B assumes the operated state the contacts remain magnetized in the direction controlled by the last-applied flux even at the conclusion of the signal. Thus relay 2B remains operated until the selection of another relay or until the all clear lead S5 has ground selectively applied thereto.

Figures 3, 3A:
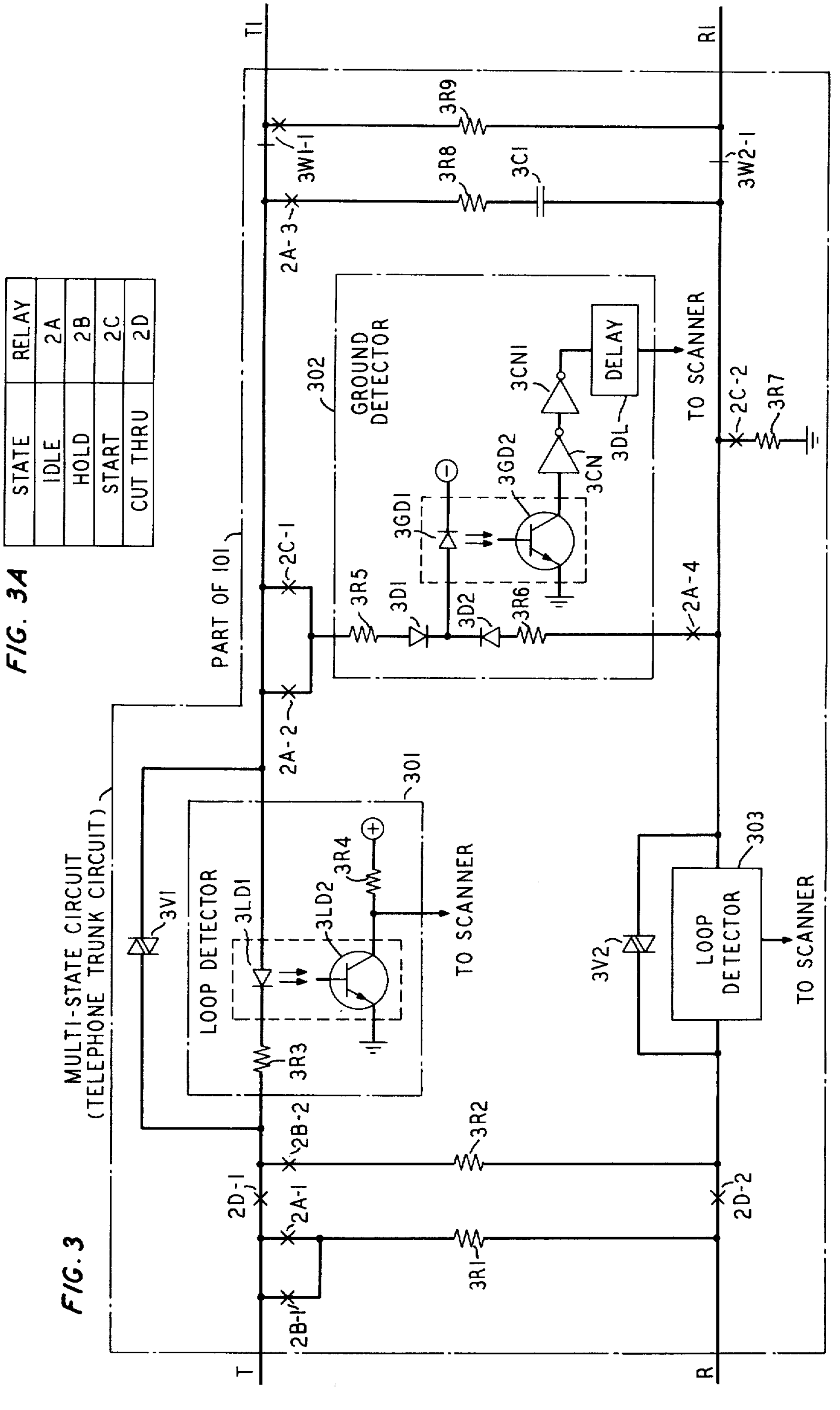
FIG. 3 shows one embodiment of a circuit using only make contacts of the relays in the network to determine the circuit states.
FIG. 3A is a chart showing the circuit states and the control relay therefor.
Figure 3B:
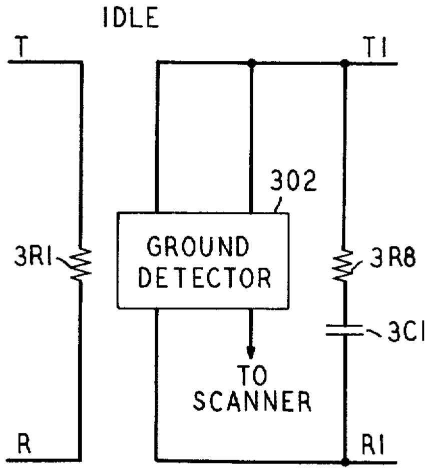
FIG. 3B, 3C, 3D and 3E show in schematic form the structure assumed by the circuit of FIG. 3 for each of the states.
Figure 3C:
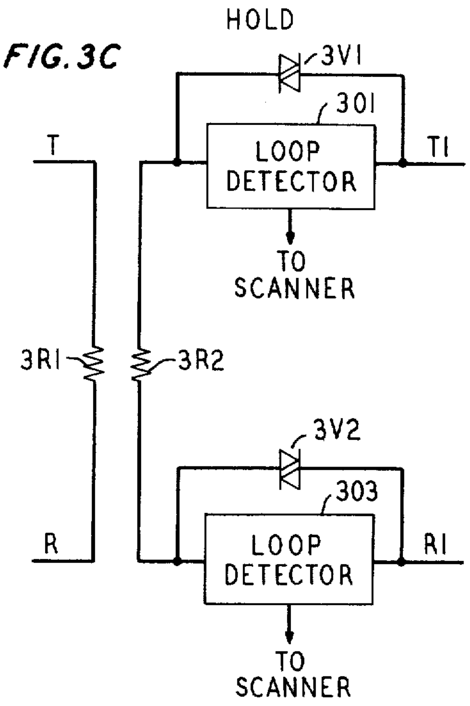
Figure 3D:
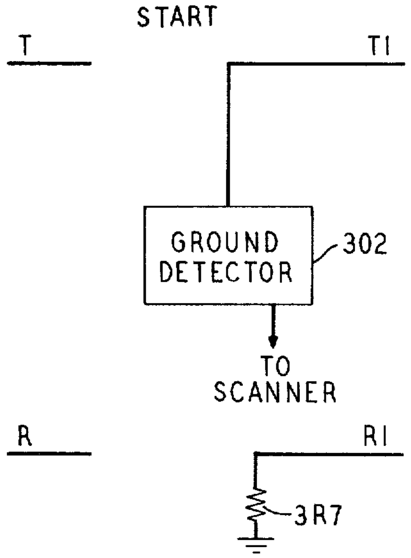
Figure 3E:
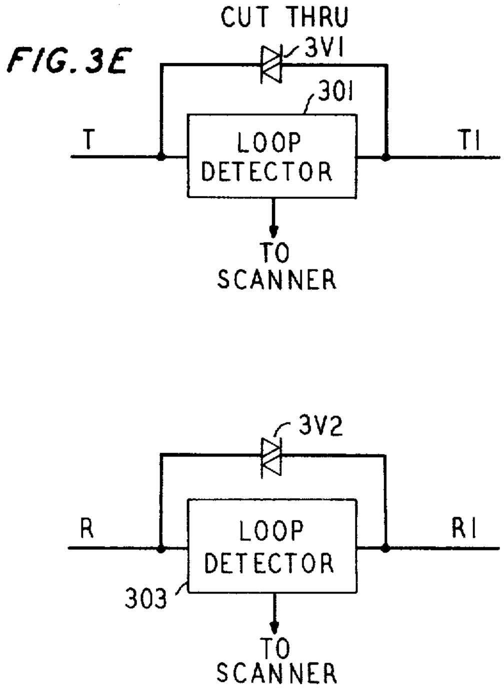

Shown in FIG. 3 is a circuit which is shown as a telephone trunk circuit having input leads T and R and output leads T1 and R1. As shown, the circuit is capable of assuming the four distinct states listed in FIG. 3A. Thus, assuming that it is desired to establish the idle state, relay 2A is operated in the manner previously described and all other relays of the network are released. Under such a condition, the circuit assumes the configuration shown in FIG. 3B. Similarly, FIG. 3C, 3D and 3E show the circuit in the states: hold, start, and cut-through, respectively. Each such state is controlled by the operation of the particular relay shown in FIG. 3A and each state is assumable from any other state directly by the selected operation of one relay.

CONCLUSION

The use of only make contacts for the control of a circuit results in simplified circuit operation on a one-hot out-of-n basis. The control for such a circuit is minimized due to the elimination of circuit state memory, and due to the fact that logic is not required to first release and then operate the circuit relays.

It should be noted that by using my make-only circuit configurations, total contact usage is minimized. This results from the fact that only one contact is needed to perform any function in any state of the circuit. In traditional designs where more than one device is used to define each state of the circuit, a contact from each device must be used to perform each function in each state of the circuit.

What is claimed is:

1. A multistate circuit arranged for connection between a telephone switching network and a telephone station, each state of said circuit arranged to provide a unique logical function with respect to an established communication connection between said switching network and said telephone station; and said circuit comprising a plurality of relays, each relay comprising:

first means operable upon the application of a current pulse for enabling an electrical circuit path therethrough, and second means operable upon the application of a current pulse for releasing said electrical circuit path, said multistate circuit comprising selective means for directing a current pulse to said first means of a selected one of said relays so as to enable said selected relay, said selective means including means for directing said current pulse to said second means of all said relays so as to release any enabled one of said relays other than said selected relay;

each said relay including at least one pair of make contacts, said second means of each relay including a pair of windings with one winding being wound in conjunction with a first one of said contacts of said contact pair and the other winding being wound in conjunction with the second one of said contacts of said contact pair, and said first means of each relay including a winding wound in conjunction with one of said windings of said second means.

2. The invention set forth in claim 1 wherein said contacts of said relays are constructed from remanent magnetic material and wherein said contacts are sealed.

3. The invention set forth in claim 1 further comprising a plurality of communication control circuits wherein each said relay includes at least one pair of contacts through which said electrical circuit path is enabled, said contacts of said relays operable for connecting selected ones of said communication control circuits to said telephone switching network and to said telephone station depending upon the particular one of said relays selectively enabled.

4. A circuit having $n$ assumable circuit state conditions, said circuit arranged for connection between a telephone station network and a telephone station and each state of said circuit arranged to provide a unique logical function with respect to an established communication connection between said switching network and said telephone station, and said circuit comprising:

$n$ relays, each relay having a plurality of make contacts and said contacts interconnected in a manner such that upon the enabling of one and only one of said relays said circuit assumes the state condition associated with said enabled relay;

means for selectively enabling said relays;

means operative in conjunction with said selectively enabling means and operable in response to the selected enabling of one of said relays for releasing any other operated one of said relays;

said selectively enabling means including means individually associated with each said relay operable upon the application of a current pulse for closing said make contacts of said relay;

said releasing means including means individually associated with each said relay operable for opening said make contacts of said relay;

said plurality of make contacts associated with each relay arranged in pairs and said individually associated releasing means including a pair of windings, one winding being wound in conjunction with a first one of said contacts of each pair of contacts associated with said relay and the other winding being wound in conjunction with the second one of said contacts of each pair of contacts associated with said relay; and said individually associated enabling means including a winding wound in conjunction with one of said windings of said releasing means.

5. The invention set forth in claim 4 wherein said contacts of said relays are constructed from remanent magnetic material.

6. The invention set forth in claim 4 further comprising a plurality of communication control circuits wherein each said relay includes at least one pair of contacts through which said electrical circuit path is enabled, said contacts of said relays operable for connecting selected ones of said communication control circuits to said telephone switching network and to said telephone station depending upon the particular one of said relays selectively enabled.

* * * * *